United States Patent
Yoneji (10) Patent No.: US 8,115,810 B2
(45) Date of Patent: Feb. 14, 2012

(54) VEHICLE-PERIPHERY VIEWING APPARATUS

(75) Inventor: Osamu Yoneji, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 1376 days.

(21) Appl. No.: 11/357,174

(22) Filed: Feb. 21, 2006

(65) Prior Publication Data

US 2006/0187238 A1    Aug. 24, 2006

(30) Foreign Application Priority Data

Feb. 21, 2005   (JP) .................... 2005-044453
Jan. 25, 2006   (JP) .................... 2006-016216

(51) Int. Cl.
*H04N 7/18* (2006.01)
(52) U.S. Cl. ............................ 348/148
(58) Field of Classification Search ........... 348/148
See application file for complete search history.

(56) References Cited

U.S. PATENT DOCUMENTS

| | | | | |
|---|---|---|---|---|
| 5,949,331 A * | 9/1999 | Schofield et al. | ............ | 340/461 |
| 6,476,855 B1 * | 11/2002 | Yamamoto | ............ | 348/148 |
| 7,486,801 B2 * | 2/2009 | Suzuki et al. | ............ | 382/103 |
| 2001/0028393 A1 * | 10/2001 | Tomida et al. | ............ | 348/207 |
| 2003/0021490 A1 * | 1/2003 | Okamoto et al. | ............ | 382/284 |
| 2003/0095182 A1 * | 5/2003 | Imoto | ............ | 348/148 |
| 2005/0083405 A1 * | 4/2005 | Imoto et al. | ............ | 348/148 |

FOREIGN PATENT DOCUMENTS

| | | |
|---|---|---|
| DE | 199 23 964 C2 | 12/1999 |
| JP | A 11-338074 | 12/1999 |
| JP | A 2002-109697 | 4/2002 |
| JP | A 2003-159995 | 6/2003 |
| JP | A 2004-96359 | 3/2004 |
| JP | A 2004-98739 | 4/2004 |
| JP | A 2004-173071 | 6/2004 |

* cited by examiner

*Primary Examiner* — David Ometz
*Assistant Examiner* — Dillon Durnford Geszvain
(74) *Attorney, Agent, or Firm* — Oliff & Berridge, PLC (57) ABSTRACT

A vehicle-periphery viewing apparatus comprises an imaging device, an electronic control unit, and a display device. The imaging device captures an image of a surrounding area of the vehicle and comprises a field of view larger in a horizontal direction than in a vertical direction. An electronic control unit comprises: a mask image storage section: and a photomontage section merging a video captured by the imaging device and the mask image read from the mask image storage section, to generate a merged video. The mask image comprises: an upper mask displayed along an upper side of the display screen; and a lower mask displayed along a lower side of the display screen; and an interval between the upper mask and the lower mask in a first direction, becomes narrower toward a center area and wider toward both ends in a second direction.

8 Claims, 5 Drawing Sheets

FIG. 8

VEHICLE-PERIPHERY VIEWING APPARATUS

CROSS-REFERENCE TO RELATED APPLICATIONS

This application is based on and claims the benefit of priority from the prior Japanese Patent Applications No. 2005-44453, filed on Feb. 21, 2005, and No. 2006-16216, filed on Jan. 25, 2006; the entire contents of which are incorporated herein by reference.

TECHNICAL FIELD

The present invention relates to a vehicle-periphery viewing apparatus which is mounted on a vehicle, captures images of surroundings of the vehicle, and displays the captured images in the interior of a passenger compartment.

BACKGROUND

Figure 6:
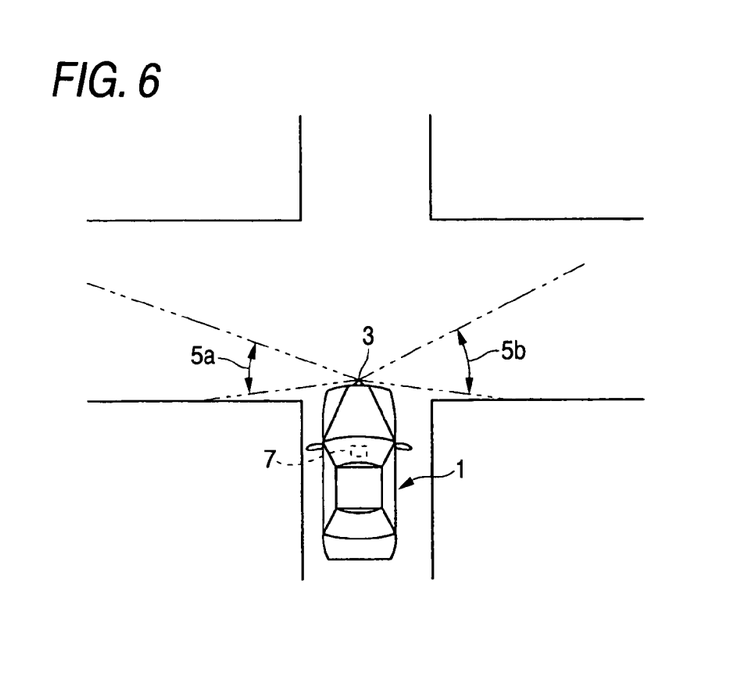
FIG. 6 is a schematic view showing that right and left imaging areas ahead of a vehicle are captured by the imaging camera mounted at the front end of the vehicle.

As shown in FIG. 6, in a vehicle-periphery viewing apparatus as described in, e.g., JP-A-2004-173071, an imaging device 3 is set at the front end of a vehicle 1; an image of a left imaging area 5a and an image of a right imaging area 5b, both areas being located ahead of the vehicle, are captured by the imaging device 3; and the thus-captured images are displayed on a predetermined display device 7 set in the passenger compartment.

Figure 7:
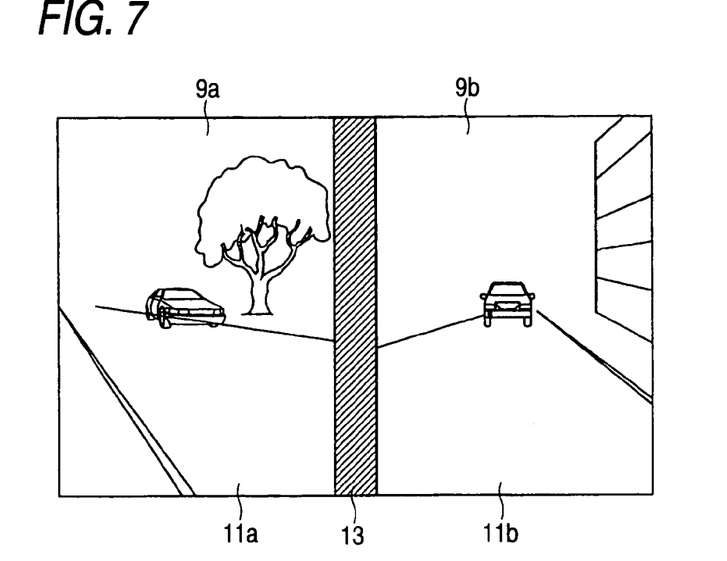
FIG. 7 is a view showing an example display on the display device in the example shown in FIG. 6.

FIG. 7 shows an example display of the display device 7 of this vehicle-periphery viewing apparatus. Conventionally, images 9a, 9b captured by the imaging device 3 are displayed in respective left and right image display areas 11a, 11b within the screen of the display device 7. A mask image 13 for dividing the left and right images 9a, 9b is displayed in the center of the screen of the display device 7 so as to be superposed on the images 9a, 9b.

SUMMARY

In the related art, images of the left and right imaging areas 5a, 5b ahead of the vehicle area are captured by the imaging device 3, and the resultant images 9a, 9b are displayed side by side on the screen of the display device 7 with the mask image 13 interposed therebetween, as shown in FIG. 7. In this case, the left and right images 9a, 9b are separated in the center by the mask image 13, so that the positional relationship between the displayed images and the actual front scene viewed through a windshield by the driver, or the like, is not clearly displayed. For these reasons, the driver encounters difficulty in determining directions from the images displayed on the display device 7.

The present invention has been made in view of the above circumstances and provides a vehicle-periphery viewing apparatus which facilitates viewing of images captured by an imaging device.

According to an aspect of the present invention, there is provided a vehicle-periphery viewing apparatus comprising: an imaging device being mounted on a vehicle, the imaging device capturing an image of a surrounding area of the vehicle, the imaging device comprising a field of view larger in a horizontal direction than in a vertical direction; an electronic control unit comprising: a mask image storage section where a predetermined mask image is stored; and a photo-montage section merging a video captured by the imaging device and the mask image read from the mask image storage section, to generate a merged video; and a display device being set in a passenger compartment of the vehicle, the display device comprising a display screen for displaying the merged video. The mask image comprises: an upper mask displayed along an upper side of the display screen; and a lower mask displayed along a lower side of the display screen; and an interval between the upper mask and the lower mask in a first direction, which corresponds to a vertical direction of the display screen, becomes narrower toward a center area and wider toward both ends in a second direction corresponding to a lateral direction of the display screen.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

<Configuration>

Figure 1:
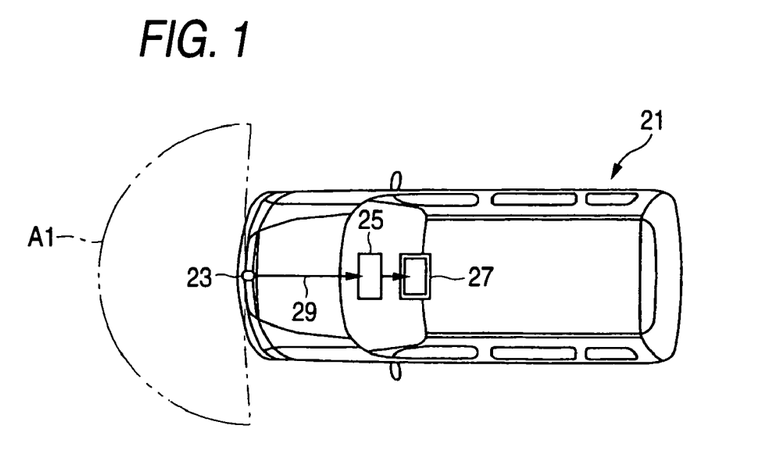
FIG. 1 is a plan view showing a vehicle equipped with a vehicle-periphery viewing apparatus according to an embodiment of the present invention.
Figure 2:
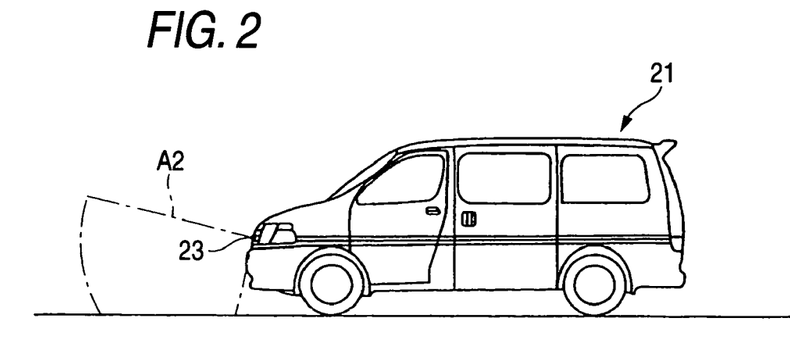
FIG. 2 is a side view showing the vehicle equipped with a vehicle-periphery viewing apparatus according to the embodiment.
Figure 3:
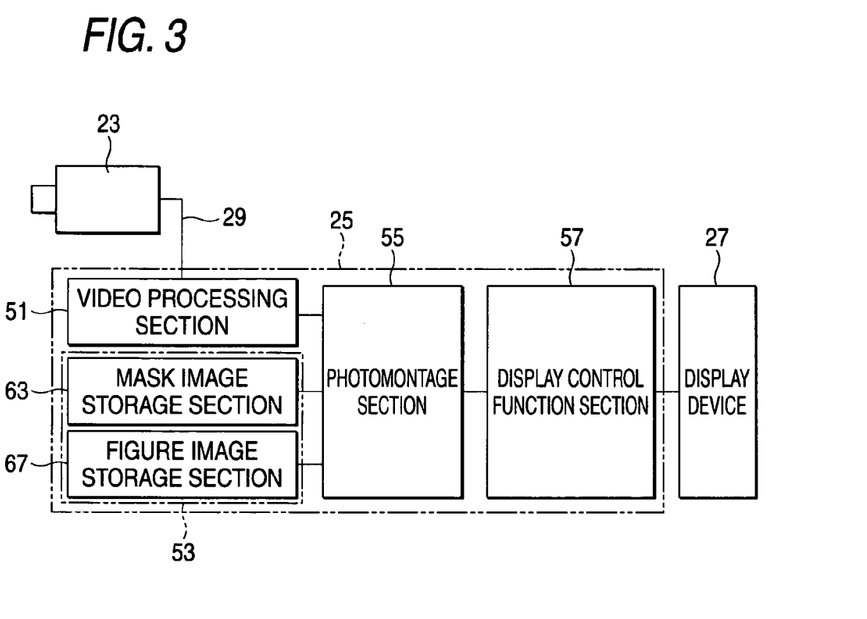
FIG. 3 is a block diagram showing the vehicle-periphery viewing apparatus of the embodiment.

FIG. 1 is a plan view showing a vehicle on which is mounted a vehicle-periphery viewing apparatus according to an embodiment of the present invention; FIG. 2 is a side view of the vehicle; and FIG. 3 is a block diagram showing the vehicle-periphery viewing apparatus.

This vehicle-periphery viewing apparatus is for capturing images of predetermined visual ranges A1, A2 surrounding a vehicle 21, including a visual range which becomes a dead angle for the driver, at a parking area or an intersection where the driver has difficulty seeing ahead. As shown in FIGS. 1 through 3, the vehicie-periphery viewing apparatus comprises an imaging device 23 (hereinafter, referred to as "an imaging camera") mounted so as to capture an image of the outside of the vehicle 21; an electronic camera control unit 25 which receives an image signal from the imaging camera 23 and performs predetermined signal processing, such as image processing; and a display device 27 for displaying the image that has undergone signal processing performed by the electronic camera control unit 25.

Figure 4:
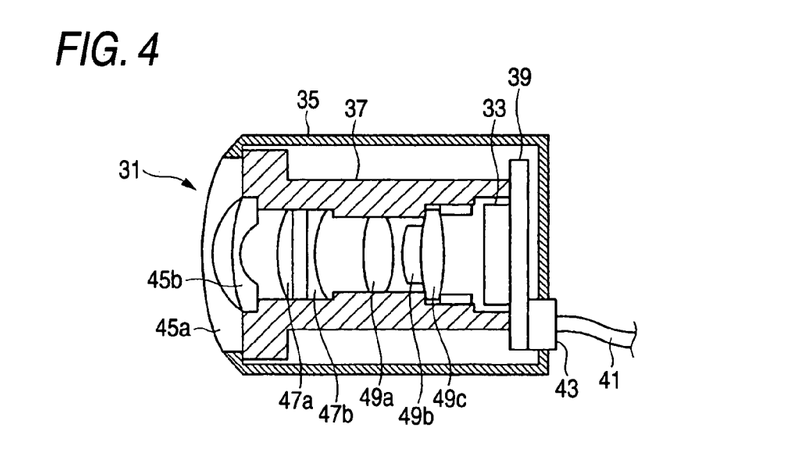
FIG. 4 is a cross-sectional view showing a camera of the vehicle-periphery viewing apparatus of the embodiment.

Each imaging camera 23 has a configuration such as that shown in, e.g., FIG. 4. As shown in FIGS. 1 and 2, the imaging camera 23 is mounted in the front center of the vehicle 21. As shown in FIG. 4, the imaging camera 23 comprises a lens system 31 which is a wide angle-of-view lens; an imaging element 33; and a case 35 containing the lens system 31 and the imaging element 33. In the embodiment shown in FIGS. 1 and 2, the camera 23 is set in the front center or side sections of the vehicle 21. In addition, as a matter of course, the camera 23 can be set on, e.g., the rear end of the vehicle 21, to thus acquire an image of a rear view of the vehicle 21 at a parking lot or a location where the driver has difficulty seeing the rear surroundings, thereby facilitating reversing, reverse parking, or stop.

Figure 5:
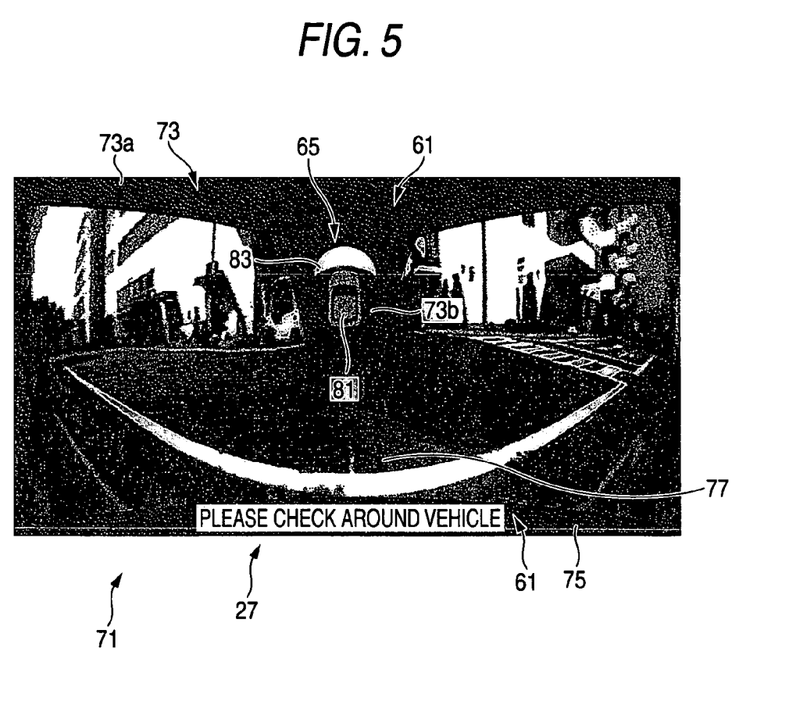
FIG. 5 is a view showing an example display on a display device of the vehicle-periphery viewing apparatus of the embodiment.

The lens system 31 is housed in the case 35 while being held in a lens case 37, except for the front end thereof. A plurality of lenses 45a, 45b, 47a, 47b, 49a, 49b, and 49c, such as a cylindrical lens or a rotationally-symmetrical lens, are sequentially arranged in the optical axis. Each imaging camera 23 can capture images of the wide visual ranges A1, A2. Specifically, the imaging camera 23 disposed in the front center of the vehicle 21 may have the horizontal visual range A1 which is wider than the vertical visual range A2. Therefore, the horizontal angle of view of the lens system 31 is set to a range of, e.g., 180° to 270° (e g., 190° or thereabouts). Further, the vertical angle of view of the lens system 31 is set to, e.g., 71° or thereabouts. Thereby, as shown in FIG. 5, the imaging camera 23 can capture an image which is ahead of the vehicle 21 and provides a sense of continuity from side to side.

As shown in FIG. 4, the imaging element 33 is formed from, e.g., a CCD (Charge-Coupled Device), and disposed rearward of the lens system 31 within the case 35 while remaining mounted on a circuit board 39. The circuit board 39 subjects the video captured by the imaging element 33 to encoding, or the like, to thus convert the image into a predetermined signal format suitable for transmission through a cable 41.

The cable 41 shown in FIG. 4 is for supplying power and a control signal to each imaging camera 23 and extracting an image signal, and constitutes a wiring harness 29 shown in FIGS. 1 and 3. In FIG. 4, reference numeral 43 designates a waterproof connector.

As shown in FIG. 3, the electronic camera control unit 25 is connected to the imaging camera 23 by the wiring harness 29 serving as an image transmission path. The electronic camera control unit 25 comprises a video processing section 51 for subjecting the image signal delivered from the imaging camera 23 to predetermined signal processing, such as encoding; a rewritable nonvolatile storage device (storage device) 53 such as flash ROM; a photomontage section 55 for combining an image subjected to signal processing performed by the video processing section 51 with various types of images previously stored in the nonvolatile storage device 53; and a display control function section 57 for displaying and controlling the display device 27 in connection with the video into which images are combined.

The video processing section 51 cuts a predetermined range of the image by encoding the image signal transmitted from the imaging camera 23 byway of the wiring harness 29; and subjects the image to processing, such as scale-up, scale-down, movement, rotation, and deformation (coordinate conversion), to thus render the video appropriate for display on the display device 27. Particularly, the video processing section 51 outputs a video—which has been captured so as to have a wider field of view in the horizontal direction than in the vertical direction—as a video to be displayed on the display device 27.

By making addresses of storage areas in the nonvolatile storage device 53 different from each other, the nonvolatile storage device 53 is provided with a mask image storage section 63 for storing a mask image 61 shown in FIG. 5 and a FIGURE image storage section 67 for storing a FIGURE image 65 shown in FIG. 5

The mask image 61 stored in the mask image storage section 63 comprises an upper mask 73 located in an upper portion of the display screen 71 on the display device 27 shown in FIG. 5, and a lower mask 75 located in a lower portion of the display screen 71 on the display device 27.

As shown in FIG. 5, the upper mask 73 comprises an upper side mask region 73a which is elongated along an upper side of the display screen 71 of the display device 27 and bulges downward at a slight angle to form a convex shape; and a region which extends upward from the center of the display screen 71 on the display device 27, namely, a center mask region 73b corresponding to an area of a video pertaining to the straight-ahead direction (forward) of the vehicle which can be directly viewed by the driver through the windshield. The upper side mask 73 is formed by the upper side mask region 73a and the center mask region 73b being connected together. The center mask region 73b is displayed while being merged with (superimposed on) a region pertaining to a video of a straight-ahead direction (forward) of a vehicle which can be viewed directly through a windshield by a person (driver or the like) who views the display device 27. A video, which extends horizontally from the front of the vehicle 21 and which is captured by the imaging camera 23, is displayed on both sides of the center mask region 73b. Accordingly, the person can view the video output from the imaging camera 23 as a video which provides a sense of continuity and a panoramic feeling.

The lower mask 75 is formed along the lower side of the display screen 71 of the display device 27 as well as into the form of a gently, upwardly oriented circular arc which is analogous to the front bumper of the vehicle 21. As shown in FIG. 5, among the videos captured by the camera 23 having a wide-field-of-view lens system 31, a video region 77—which is an image of an area located immediately below the vehicle 21 (see FIG. 2)—is transmitted to the electronic camera control unit 25 as a video which downwardly bulges in a convexedly as compared with an actual scene. As shown in FIG. 5, the lower mask 75—which imitates the front bumper of the vehicle 21 and assumes the shape of a gently, upwardly oriented circular arc—is merged so as to vertically adjoin the lower side portion of the video region 77 that is contorted downward into a convex shape. Thereby, the person who views the display device 27 can view the video region 77 showing the video that captures the image of the area located immediately below the vehicle 21 (see FIG. 2) as a panoramic video with reference to the circular-arc lower mask 75—which imitates the front bumper of the vehicle 21 and assumes the shape of a gentle circular arc oriented upward.

The figure image 65 stored in the figure image storage section 67 is placed in the center mask region 73b of the upper mask 73 on the display screen 71 of the display device 27 shown in FIG. 5. The figure image 65 is formed from a vehicle figure section 81 which represents the vehicle 21 as viewed from above, and an substantially-circular-arc visual range figure section 83 which is associated with a wide-angle-captured image as a horizontal visual range A1 of the imaging camera 23. Specifically, the figure image 65 is a combination of a vehicle image imitating the shape of an automobile (the vehicle figure section 81) and a visual range image (the visual range figure section 83) which represents a horizontal visual range of the imaging camera 23 with reference to the vehicle image. By such a figure image 65 being displayed within the center mask region 73b, the driver, or the like, can readily recognize the directionality of a video appearing on the display device 27.

Figure 8:
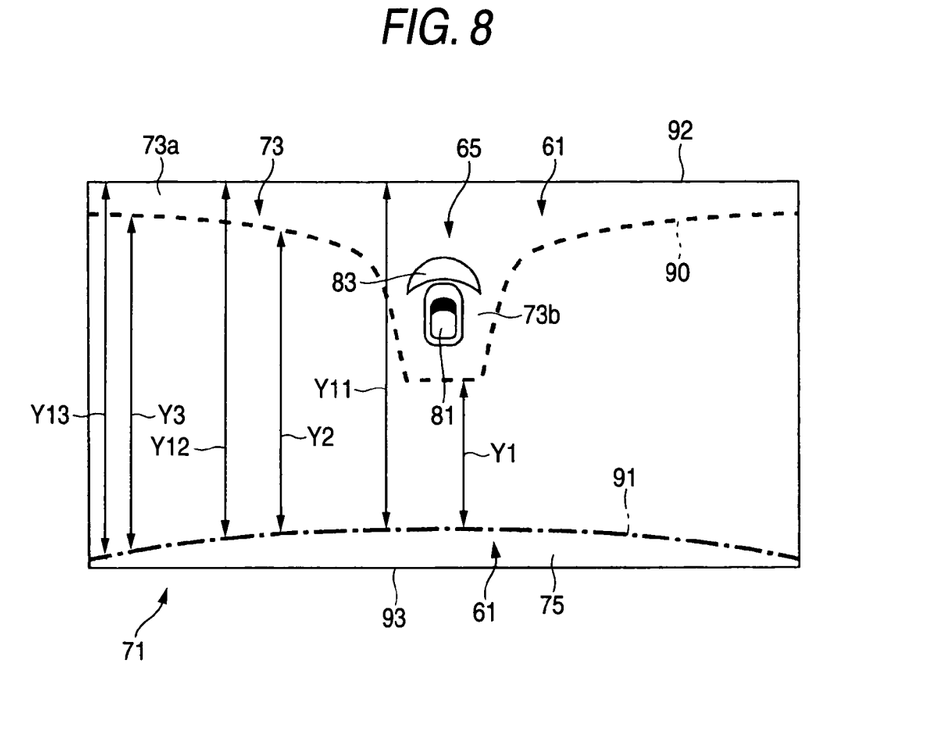
FIG. 8 is a view showing a mask image and a figure image, which are clipped from the view shown in FIG. 5.

FIG. 8 is a view showing the mask image 61 and the figure image 65, which have been cut out from FIG. 5. The mask image 61 has the upper mask 73 displayed along an upper side 92 of the display screen 71 and the lower mask 75 displayed along a lower side 93 of the display screen 71. An interval between a lower edge 90 of the upper mask 73 and an upper edge 91 of the lower mask 75 with reference to the vertical direction (hereinafter called a "first direction") on the display screen 71 becomes narrower toward the center of the display screen 71 in the lateral direction thereof (hereinafter called a "second direction), and becomes wider toward both lateral ends of the display screen. In short, a relationship of Y1<Y2<Y3 is achieved in FIG. 8.

The lower mask 75 is curved into an substantially-circular-arc shape such that the interval, achieved in the first direction, between the lower mask 75 and the upper side 92 of the display screen 71 becomes narrower toward the center and wider toward both ends in the second direction. In short, a relationship of Y11<Y12<Y13 is achieved in FIG. 8.

The upper mask 73 has the upper side mask region 73a displayed along the upper side 92 of the display screen 71 and the center mask region 73b displayed in the center of the display screen. The interval between the upper mask region 73a and the lower mask 75 achieved in the first direction becomes narrower toward the center and wider toward both ends in the second direction. Moreover, as a result of the center mask region 73b being linked to the center area of the upper mask region 73a in the second direction, the upper mask region 73a and the center mask region 73b are displayed as a single region.

The photomontage section 55 performs photomontage operation such that the upper mask 73 in the mask image storage section 63 is superimposed on the video output from the video processing section 51 along the upper side of the video; such that the lower mask 75 in the mask image storage section 63 is superimposed on the video output from the video processing section 51 along the lower side of the video; and such that the figure image 65 stored in the figure image storage section 67 is superimposed in the center of the center mask region 73b of the upper mask 73.

The display control function section 57 adjusts or converts the frame rate of the video having undergone photomontage operation performed by the photomontage section 55 or the scheme of an output signal, and outputs the resultant video signal to the display device 27.

The display device 27 is formed from a liquid-crystal display device, or the like, and set in the passenger compartment; and displays a video signal output from the display control function section 57 of the electronic camera control unit 25.

<Operation>

Operation of the vehicle-periphery viewing apparatus having the above construction will now be described.

First, as shown in FIGS. 1 and 2, the imaging camera 23 set at the front-end center of the vehicle 21 captures images of surroundings ahead of the vehicle 21, and the thus-captured images are transmitted to the electronic camera control unit 25 through the wiring harness 29.

As shown in FIG. 3, the video processing section 51 subjects the images transmitted from the imaging camera 23 to at least some of various video processing operations, such as scale-up, acale-down, movement, rotation, and deformation (coordinate conversion), such that a predetermined range thereof is clipped and that the image becomes suitable for displayed on the display device 27. Particularly, the video having undergone various video processing operations in the video processing section 51 becomes a video which is to be displayed on the display device 27 and has a wider field of view in the horizontal direction than in the vertical direction. The video is wide, especially in the horizontal direction, and has a sense of continuity with regard to the visual ranges A1, A2 in FIGS. 1 and 2. As mentioned above, the video signal having undergone the various video-processing operations is output from the video processing section 51 to the photomontage section 55.

Next, the photomontage section 55 superimposes the upper mask 73 in the mask image storage section 63 on the video output from the video processing section 51 along the upper side of the video. The lower mask 75 in the mask image storage section 63 is superimposed on the video along the lower side thereof. Moreover, photomontage operation is performed such that the figure image 65 stored in the figure image storage section 67 is superposed on the center of the center mask area 73b of the upper mask 73 (FIG. 5).

After having adjusted or converted the frame rate of the video having undergone photomontage operation in the photomontage section 55, the scheme of the output signal, or the like, the display control function section 57 outputs a video signal to the display device 27. The display device 27 displays the video signal output from the display control function section 57 of the electronic camera control unit 25.

When the video captured by the imaging camera 23 appears on the display screen 71 of the display device 27, the upper mask region 73a of the upper mask 73 is provided in an elongated manner along the upper side of the display screen 71 of the display device 27, as shown in FIG. 5. Further, the center mask region 73b of the upper mask 73 is displayed in the area which extends upward from the center of the display screen 71 of the display device 27; namely, the video area of the straight-ahead direction (forward) of the automobile which can be viewed directly by the driver through a windshield.

As shown in FIG. 5, the center mask region 73b is displayed, which being merged with (superimposed on), in the video region of the straight-ahead direction (forward) of the automobile which can be viewed by the driver through the windshield. The video that extends horizontally from the front of the vehicle 21 and is captured by the imaging camera 23 is displayed on both sides of the center mask region 73b. Accordingly, the video captured by the imaging camera 23 can be viewed as a video which provides a sense of continuity and a panoramic sense.

As shown in FIG. 5, the circular-arc lower mask 75 that imitates the front bumper of the vehicle 21 and assumes the gently, upwardly oriented circular-arc shape is displayed along the lower side of the display screen 71 of the display device 27 while being superimposed on the video. The person who views the display device 27 can view the video region 77—which captures the image of the area located immediately below the vehicle 21 see FIG. 2)—as a panoramic image with reference to the circular-arc lower mask 75 that imitates the front bumper of the vehicle 21 and assumes the gently, upwardly oriented circular arc.

As shown in FIG. 5, the figure image 65 stored in the figure image storage section 67 is displayed in the center mask region 73b of the upper mask 73 on the display screen 71 of the display device 27. The figure image 65 has the vehicle figure section 81 which represents the vehicle 21 as viewed from above, and the substantially-circular-arc visual range figure section 83 which is associated with a wide angle captured image as a horizontal visual range A1 of the imaging camera 23. Therefore, the driver or the like can readily recognize the directionality of the video appearing on the display device 27.

As has been described, the driver, or the like, can readily recognize the relevance of the straight-ahead (forward) direction of the vehicle, which can be viewed directly through the windshield, to the video displayed on the display device 27; the directionality of the video which extends laterally from a position forward of the vehicle; and the positional relevance of the video, showing the area located immediately below the vehicle, to the bumper of the vehicle 21. A video which is easily viewed intuitively by virtue of the "sense of continuity and panoramic feeling" can be displayed on the display device 27.

The upper mask region 73a of the upper mask 73 is formed in an elongated shape along the upper side of the display screen 71 of the display device 27 and into the form of a convex shape which bulges downward at a slight angle. The upper side mask region 73a and the center mask region 73b are formed in a linked manner. Moreover, the lower mask 75, which is formed along the lower side of the display screen 71 of the display device 27 in an elongated manner, is formed in the form of a circular-arc which imitates the front bumper of the vehicle 21 and protrudes gently upward. The display screen 71 of the display device 27 is masked such that the display area of the video becomes greater toward both lateral sides of the display screen 71.

Thereby, the sense of distortion of the entire video is lessened by the upper mask 73 and the lower mask 75. Since the panoramic video can be displayed on the display device 27, the driver, or the like, can readily associate the video captured by the imaging camera 23 with a wide-field-of-view captured image.

With reference to the vehicle figure section 81, the visual area figure section 83 of the figure image 65 is formed into an substantially-circular-arc form, which is associated with a wide field-of-view image, as the visual range A1 of the imaging camera 23 in the horizontal direction thereof. The driver, or the like, can readily associate the video captured by the imaging camera 23 with a wide-field-of-view image.

According to the embodiment, the upper mask comprises: an upper mask region displayed along the upper side of the display screen; and a center mask region displayed in a center of the display screen. The interval between the upper side mask region and the lower side mask in the first direction becomes narrower toward the center region and wider toward both ends. The upper side mask region and the center mask region are integrally displayed by connecting the center mask region to a center of the upper side mask region.

According to the embodiment, the electronic control unit further comprises: a figure image storage section that stores a figure image formed by combination of a vehicle image imitating the shape of an automobile with a visual-range image showing a horizontal visual range of the imaging device with reference to the vehicle image. A photomontage section superimposes the figure image read from the figure image storage section on the center mask region of the merged video by merging operation.

According to the embodiment, the lower mask is substantially curved into an circular arc shape such that an interval between the lower side mask and the upper side of the display screen in the first direction becomes narrower toward the center area and wider toward both ends.

According to the embodiments, a video which continuously extends from the front to both sides of the vehicle is displayed on the display screen, and hence the observer of the display screen can have a sense of continuity while viewing a video. Moreover, the interval between the upper side mask and the lower side mask in the first direction (the vertical direction of the display screen) becomes narrower toward the center region and wider toward both ends in the second direction (the horizontal direction of the display screen). Therefore, the observer of the display screen can view a panoramic video.

According to the embodiment, the center mask region is displayed in the center of the display screen which can be viewed directly by the driver through a windshield. The center mask region is displayed in the center of the display screen, so that the display of lateral sections of the display screen can be enhanced.

According to the embodiment, a figure image formed by combination of the vehicle image with the visual range image is displayed in a superimposed manner, so that the driver can readily ascertain the directionality of the video appearing on the display screen. Consequently, the driver can easily view the video captured by the imaging device.

According to the embodiment, the lower side mask displayed along the lower side of the display screen is curved into an substantially-circular-arc shape such that the interval between the lower side mask and the upper side of the display screen in the first direction becomes narrower toward the center region and wider toward both ends. Therefore, the lower mask is viewed as a shape imitating the front bumper of the vehicle. The driver can view a video region which captures an image of an area located immediately below the vehicle as a panoramic image with reference to the lower side mask.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined solely by the following claims and their equivalents.

What is claimed is:

1. A vehicle-periphery viewing apparatus comprising:
   an imaging device being mounted on a vehicle, the imaging device capturing an image of a surrounding area of the vehicle, the imaging device comprising a field of view larger in a horizontal direction than in a vertical direction;
   an electronic control unit comprising:
      a mask image storage section where a predetermined mask image is stored; and
      a photomontage section merging a video captured by the imaging device and the mask image read from the mask image storage section, to generate a merged video; and
      a display device comprising a display screen for displaying the merged video, the display screen having a vertical direction between an upper side of the display screen and a lower side of the display screen and a lateral direction between a left side of the display screen and a right side of the display screen,
   wherein the mask image comprises:
      an upper mask region displayed along the upper side of the display screen; and
      a lower mask region displayed along the lower side of the display screen;
      an interval being an area without a mask, the interval consisting of only the image which is detected by the imaging device provided on a front of the vehicle, the image which continuously extends from the front to both sides of the vehicle is displayed on the display screen, the interval is displayed continuously from near the left side of the display to near the right side of the display screen, the interval being disposed continuously between the upper mask region and the lower mask region, a vertical distance of the interval becoming narrower toward a center area of the display screen and wider toward the left side and the right side; and a center mask region extending from a substantially-center portion of the interval in the vertical direction to the upper side of the display screen.

2. The vehicle-periphery viewing apparatus according to claim 1, wherein the interval comprises outer portions disposed near the left and right sides of the display screen, a central portion disposed near the center area of the display and inner portions disposed between respective outer portions and the central portion, and wherein the upper mask region and the center mask region are integrally displayed by connecting the center mask region to a center of the upper mask region in the lateral direction.

3. The vehicle-periphery viewing apparatus according to claim 2, wherein the electronic control unit further comprises:

a figure image storage section that stores a figure image formed by combination of a vehicle image imitating the shape of an automobile with a visual-range image showing an outline of a horizontal visual range of the imaging device with reference to the vehicle image; and wherein a photomontage section superimposes the figure image read from the figure image storage section on the center mask region of the merged video by a merging operation.

4. The vehicle-periphery viewing apparatus according to claim 1, wherein the lower mask is substantially curved into a circular arc shape such that a vertical distance of a portion of the interval between the lower mask region and the upper side of the display screen becomes narrower toward the center area of the display screen and wider toward the right side and the left side.

5. The vehicle-periphery viewing apparatus according to claim 1, wherein the imaging device has a wide-field-of-view lens system such that the video captured by the imaging device is displayed continuously across the entire interval.

6. The vehicle-periphery viewing apparatus according to claim 5, wherein the video captured by the imaging device is displayed downwardly bulging in a convex scene on the display screen.

7. The vehicle-periphery viewing apparatus according to claim 3, wherein the outline of the horizontal visual range of the imaging device is a substantially circular arc.

8. The vehicle-periphery viewing apparatus according to claim 1, wherein the display device is set in a passenger compartment of the vehicle.

* * * * *